US009503527B1

(12) United States Patent
O'Sullivan et al.

(10) Patent No.: US 9,503,527 B1
(45) Date of Patent: Nov. 22, 2016

(54) PERSONALIZED PHONE REGISTRATION BASED ON VIRTUAL DESKTOP INFRASTRUCTURE

(71) Applicant: Cisco Technology, Inc., San Jose, CA (US)

(72) Inventors: Patrick O'Sullivan, County Galway (IE); Joseph Enda Smyth, Galway (IE); Michelle Concannon, County Galway (IE); Niall Murphy, Galway (IE); Cris Cristina, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 424 days.

(21) Appl. No.: 13/834,720

(22) Filed: Mar. 15, 2013

(51) Int. Cl.
*H04L 29/08* (2006.01)

(52) U.S. Cl.
CPC .................. *H04L 67/141* (2013.01)

(58) Field of Classification Search
CPC ...... G06F 9/54; G06F 2209/545; G06F 3/01; G06F 3/0481; G06F 3/14; G06F 2201/815; G06F 2209/549; G06F 9/4445; G06F 9/455; G06F 9/45558; H04L 67/14; H04L 67/141; H04L 12/4641; H04L 29/06027; H04L 65/1073; H04L 63/0272; H04L 65/1006; H04M 2203/252; H04W 36/0022; H04W 4/22
See application file for complete search history.

(56) References Cited

U.S. PATENT DOCUMENTS

| | | | | |
|---|---|---|---|---|
| 8,621,261 B2* | 12/2013 | Baird | ................. | G06F 11/1479 |
| | | | | 714/4.11 |
| 8,761,358 B2* | 6/2014 | Biswas | ................. | G06F 9/4445 |
| | | | | 370/352 |
| 8,893,027 B2* | 11/2014 | Friedl | ................... | G06F 9/4445 |
| | | | | 703/23 |
| 8,966,093 B2* | 2/2015 | Smyth et al. | ................. | 709/227 |
| 9,003,203 B2* | 4/2015 | Bursell | ..................... | H04L 9/08 |
| | | | | 713/189 |
| 9,032,026 B2* | 5/2015 | Mazzaferri | ............. | G06F 9/542 |
| | | | | 709/204 |
| 9,069,438 B2* | 6/2015 | Sharp | ................. | G06F 9/45558 |
| 9,231,983 B2* | 1/2016 | Kennedy | ................ | G06F 21/57 |
| 9,264,284 B2* | 2/2016 | Summers | ................ | H04L 29/06 |
| 2004/0125923 A1* | 7/2004 | See | .................... | H04L 12/4641 |
| | | | | 379/88.17 |
| 2006/0002315 A1* | 1/2006 | Theurer | ................ | G06F 3/0481 |
| | | | | 370/261 |
| 2010/0159977 A1 | 6/2010 | Shaffer et al. | | |
| 2010/0275200 A1* | 10/2010 | Radhakrishnan et al. | ........ | 718/1 |

(Continued)

*Primary Examiner* — Sargon Nano
(74) *Attorney, Agent, or Firm* — Edell, Shapiro & Finnan, LLC (57) ABSTRACT

Techniques are provided for a client device accessing a host virtual desktop (HVD) server in a network. At the client device, a session is initiated with the HVD server to access a virtual desktop hosted by the HVD server. The client device launches via the virtual desktop a communications application hosted by the HVD server to cause the communications application to obtain communication identifier information from a communications manager server. The communication identifier information is forwarded from the HVD server to the client device. The client device registers with the communications manager server using the communication identifier information to enable the client device to take on a persona of a user that is associated with the communication identifier information.

20 Claims, 6 Drawing Sheets

(56) References Cited

U.S. PATENT DOCUMENTS

| | | | |
|---|---|---|---|
| 2011/0055824 A1* | 3/2011 | Benari | 717/176 |
| 2011/0258308 A1 | 10/2011 | Arumugam et al. | |
| 2012/0120085 A1 | 5/2012 | Kanalakis, Jr. et al. | |
| 2012/0213160 A1* | 8/2012 | Ezrol | H04L 12/66 370/328 |
| 2012/0213294 A1* | 8/2012 | Hobgood et al. | 375/240.25 |
| 2012/0218374 A1* | 8/2012 | Matula | H04L 65/1006 348/14.12 |
| 2012/0226985 A1* | 9/2012 | Chervets | G06F 9/4445 715/735 |
| 2012/0233549 A1* | 9/2012 | Ricci | 715/740 |
| 2012/0239729 A1* | 9/2012 | Hefter | G06F 9/4416 709/203 |
| 2012/0303476 A1* | 11/2012 | Krzyzanowski | G06F 8/60 705/26.5 |
| 2012/0303762 A1* | 11/2012 | Geiser | 709/219 |
| 2013/0013664 A1* | 1/2013 | Baird et al. | 709/203 |
| 2013/0058472 A1* | 3/2013 | de Jong | H04M 3/565 379/202.01 |
| 2013/0115880 A1* | 5/2013 | Dal Bello | H04L 67/303 455/41.2 |
| 2013/0263227 A1* | 10/2013 | Gongaware | H04L 63/08 726/4 |
| 2013/0326081 A1* | 12/2013 | Katz | H04L 65/608 709/231 |
| 2013/0326512 A1* | 12/2013 | Katz | H04L 65/4084 718/1 |
| 2015/0127713 A1* | 5/2015 | Feng | H04L 67/10 709/202 |

* cited by examiner

PERSONALIZED PHONE REGISTRATION BASED ON VIRTUAL DESKTOP INFRASTRUCTURE

TECHNICAL FIELD

The present disclosure relates to thin client devices operating in a virtual desktop infrastructure environment.

BACKGROUND

Thin client devices are often deployed in a network environment to access applications hosted by remote servers. For example, thin clients may be deployed in a hot-desk arrangement, where thin clients are set up for access by end users. An end user can log-in via one of the thin clients to access the applications hosted by a remote server to which the client devices are connected. In addition to hosting the applications, the remote servers also may host communications application software to enable the thin client devices to participate in various communication services, such as telephony, teleconferences, etc.

DESCRIPTION OF EXAMPLE EMBODIMENTS

Overview

Techniques are presented herein for a client device accessing a host virtual desktop (HVD) server in a network. At the client device, a session is initiated with the HVD server to access a virtual desktop hosted by the HVD server. The client device launches, via the virtual desktop, a communications application hosted by the HVD server to cause the communications application to obtain communication identifier information from a communications manager server. The communication identifier information is forwarded from the HVD server to the client device. The client device registers with the communications manager server using the communication identifier information to enable the client device to take on a persona of a user that is associated with the communication identifier information.

Example Embodiments

Figure 1:
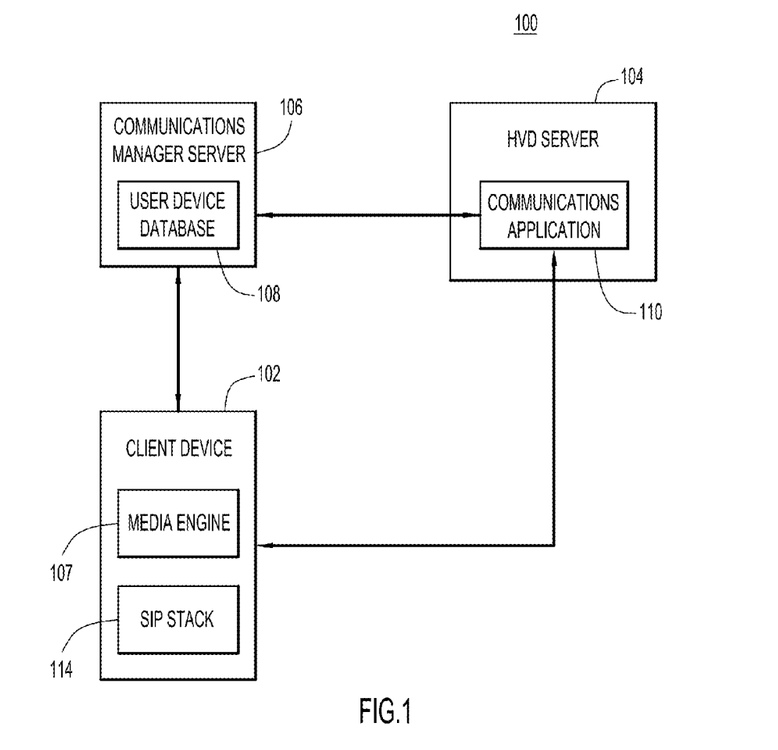
FIG. 1 shows an example network topology including a client device in communication with a host virtual desktop (HVD) server and a communications manager server.

The techniques described herein relate to a client device communicating with a host virtual desktop (HVD) server and a communications manager server to enable the client device to take on a persona of a user that is logged in at the client device. The user that is logged in at the client device is then able to send and receive media communications with other users at other client devices in a network. An example system topology (hereinafter "system" or "network") is shown at reference numeral 100. The network 100 comprises a client device 102, an HVD server 104 and a communications manager server 106. The client device 102 is configured to exchange communications with the HVD server 104 and the communications manager server 106, as described herein. Likewise, the HVD server 104 is configured to exchange communications with the client device 102 and the communications server 106.

The client device 102 may be a computer device, laptop, tablet, mobile device, network telephone, etc. that is configured to initiate a session with the HVD server 104 and to exchange communications (e.g., communications to enable audio, video and telephone exchanges) with the HVD server 104 and the communications manager server 106, as described herein. The client device 102 has media engine software ("media engine") 107 that enables the client device 102 to send and receive media data that may be part of a telephone conference or other communication sessions between the client device 102 and another client devices in the network 100. Additionally, the client device 102 has a Session Initiation Protocol (SIP) stack 114 to allow for SIP call processing functions. The HVD server 104 is a server that is configured to host a plurality of applications and services that may be accessible by the client device 102 upon proper authentication. For example, the HVD server 104 may be a server that hosts software for applications that may be accessible to client devices in the network 100. The HVD server 104 hosts a communications application 110 that enables the client device 102 to initiate telephonic or other person-to-person communications with other client devices in the network via the HVD server 104. In one example, the communications application 110 may be a presence server that enables instant messaging or other communications, though it should be appreciated that the communications application 110 may represent any communications services hosted by the HVD server 104.

The communications manager server 106 is a server that stores a user device database, shown at reference numeral 108 in FIG. 1, and is used to manage various communications applications, such as telephony, instant messaging, video conferencing, web-based conferencing, etc. As described herein, the user device database 108 stores information (e.g., a table) that comprises a list of users and corresponding communication identifier information (e.g., phone numbers) associated with each user, based on a user identifier (e.g., username). Ultimately, as described by the techniques herein, the communication identifier information for a particular user is passed to the client device 102 in the network 100 to enable the client device 102 to take on a persona of the user based on the associated communication identifier information.

The client device 102 may be a "thin client" device that is configured to log-in to the HVD server 104 to access applications and services that are hosted by the HVD server 104. For example, according to the techniques herein, a user (not shown in FIG. 1) at the client device 102 may initiate a session with the HVD server 104 by entering a username and password at the client device 102. This information is then sent to the HVD server 104, and upon valid authentication and authorization of the user at the HVD server 104, the user at the client device 102 may then access services (e.g., software for operating system applications) and infrastructure (e.g., memory) hosted by the HVD server 104. In one example, the HVD server 104 provides the client device 102 with a virtual desktop that displays services and infrastructure hosted by the HVD server 104 and accessible by the client device 102. The HVD server 104 may be configured to provide access to virtual desktops for other client devices (not shown in FIG. 1) to enable these other client devices to access the services hosted by the HVD server 104. Thus, the HVD server 104 enables a virtual desktop infrastructure (VDI) for thin client devices in the network 100. It should be appreciated that network 100 may comprise several client devices and HVD servers in communication with the client devices. For simplicity, a single client device 102 and HVD server 104 is shown in FIG. 1.

In one example, a user (e.g., an employee of an organization) may attempt to access a central server of the organization via a thin client device in order to participate in a telephone conference. For example, when the thin client device (e.g., client device 102) is a device with local phone capabilities, the call may be initiated by the user at the client device 102 and the call may be controlled by the thin client device. For example, these local phone capabilities may enable the client device 102 to display user interface components and media (e.g., audio/video) about call events to the user. In another example, when the user is logged into the HVD server 104, the call can be initiated and controlled from the communications application 110 of the HVD server 104. The user may be located at the same location as the client device 102. The client device 102 is configured to send and receive audio, video and other data required as a part of a telephone conference. For example, the client device 102 may be a laptop that is enabled to participate in the telephone conference or the client device 102 may be an Internet Protocol (IP) telephone device. The techniques described herein allow the user to use the client device 102 to participate in the telephone conference by, for example, causing the client device 102 to take on the persona of the user.

It should also be appreciated that the client device 102 may operate in one of several arrangements. For example, the client device 102 may be a thin client device that operates as a "hot-desktop" client device or as a "fixed-desktop" client device. When the client device 102 operates as a hot-desktop, any user can utilize the client device 102 to log-in to the HVD server 104 and to engage in communications with the HVD server 104 and the communications manager server 106 in order to send and receive data with other client devices. For example, for telephone communications, any user can utilize the client device 102 (which may be a network telephone) in the hot-desktop configuration to exchange communications with the HVD server 104 and the communications manager server 106 by logging in and having the user's corresponding communication identifier information associated with the client device 102, as described herein. When the client device 102 operates as a fixed-desktop, the client device 102 preregisters with the communications manager server 106, as described herein, in order to enable a user of the client device to send and receive calls and data associated with the calls. It should be appreciated that the term "fixed-desktop" as used herein refers to a client device that has local phone capabilities. For example, a client device with local phone capabilities can be used by any user who chooses to log into the HVD server 104 using the client device. In this fixed-desktop arrangement, as described by the techniques herein, the client device with local phone capabilities then has its communication identifier (e.g., a phone number) changed by the communications application 110 of the HVD server 104 to correspond to the new user who logs into the HVD server 104. Additionally, in one example, in the scenario where client device 102 has local phone capabilities and is using communication identifier information that corresponds to the same user who later logs into the HVD server 104 using the client device 102, there is no need for the client device 102 to change its communication identifier information. This essentially allows the user of the client device 102 with local phone capabilities to optionally use the client device 102 or the HVD server 104 when logged into the HVD server 104 while retaining the same communication identifier information (e.g., phone number) without the client device 102 receiving the same communication identifier information again.

Figure 2:
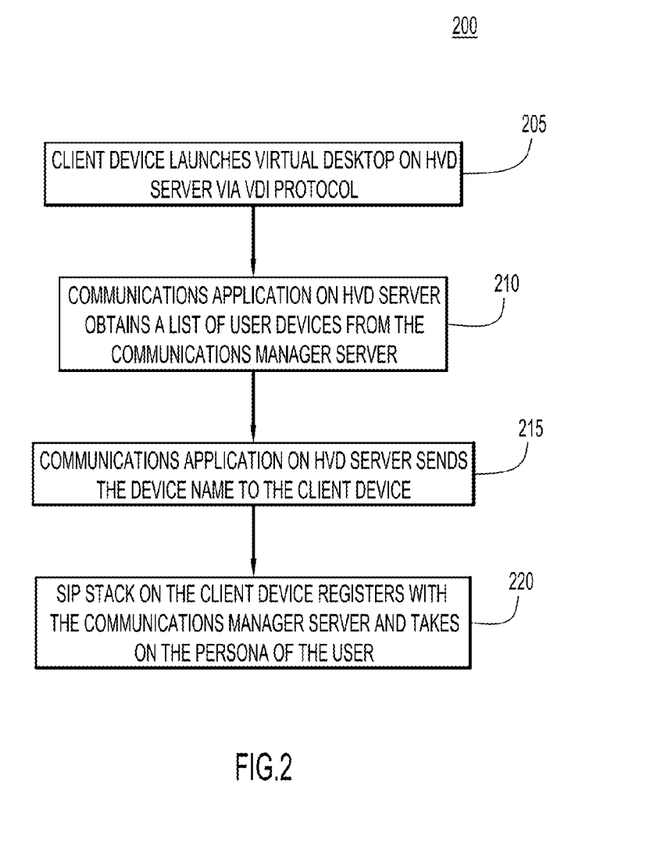
FIG. 2 shows an example flow chart depicting operations of the client device in a hot-desktop arrangement to register with the communications manager server.

Reference is now made to FIG. 2, which shows an example flow chart 200 depicting operations performed by the client device 102 in the hot-desktop arrangement. The operations described in connection with FIG. 2 show general operations of the client device 102 in the hot-desktop arrangement, and it should be appreciated that further details are provided in reference to FIG. 4, below. In FIG. 2, at operation 205, the client device 102 launches a virtual desktop on the HVD server 104. For example, the client device 102 may launch the virtual desktop using a VDI protocol. At 210, the communications application 110 on the HVD server 104 obtains a list of user devices (e.g., names of user devices and communication identifier information of the user devices) that are associated with the user from the communications manager server 106. At operation 215, the communications application 110 instructs the HVD server 104 to send a message that comprises the device names and communication identifier information to the client device 102. At operation 220, the SIP stack 114 on the client device 102 registers with the communications manager 106 (e.g., by sending a message to the communications manager server 106 with the communication identifier information and client device information) using the communication identifier information received from the HVD server 104. Thus, upon registering with the communications manager server 106, the client device 102 takes on the persona of the user. In other words, the device names, communication identifier information and other call setting/profile information (e.g., number of telephone rings before a call is directed to voicemail, length of calls, etc.) that is unique to the user are associated with the client device 102, and thus, the user 102 can use the client device 102 to make calls to other client devices, and users of other client devices, in the network 100.

Figure 3:
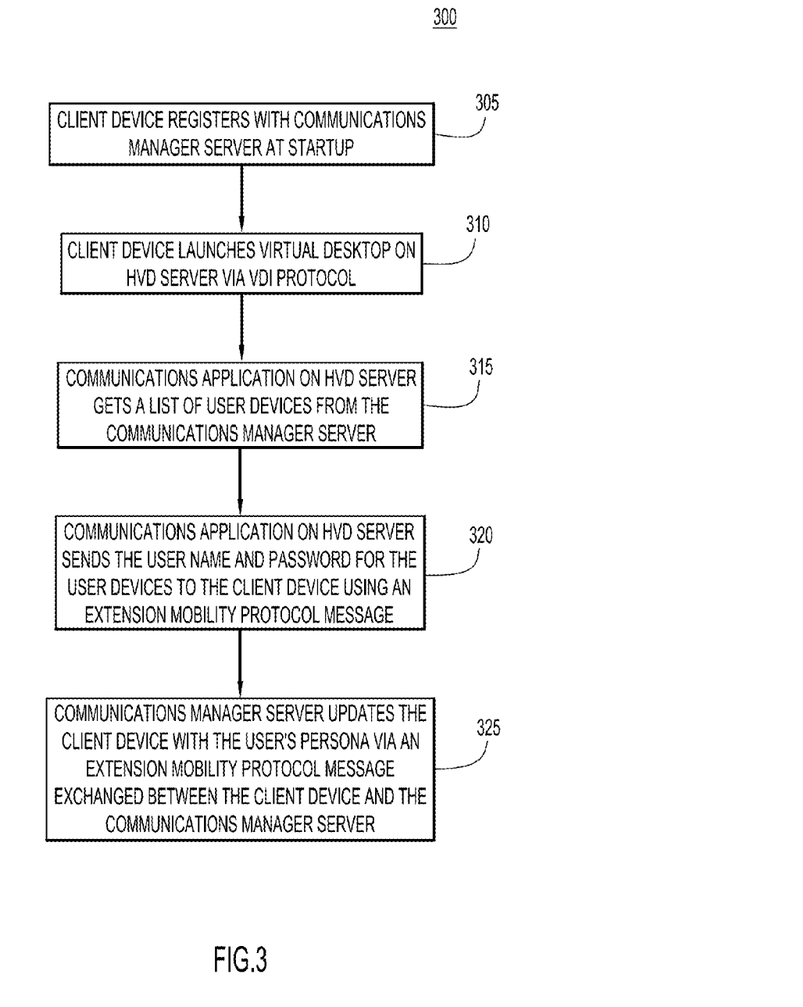
FIG. 3 shows an example flow chart depicting operations of the client device in a fixed-desktop arrangement configured to register with the communications manager server.

Reference is now made to FIG. 3, which shows an example flow chart 300 depicting operations performed by the client device 102 in the fixed-desktop arrangement. The operations described in connection with FIG. 3 are general operations of the client device 102 in the fixed-desktop arrangement, and it should be appreciated that further details are provided in reference to FIG. 4, below. At operation 305, the client device 102 registers with the communication manager server 106 as it starts up. Operations 310 and 315 are similar to operations 205 and 210, respectively, in FIG. 2. Specifically, in operation 310, the client device 102 launches the virtual desktop on the HVD server 104 via a VDI protocol, and at operation 315, the communications application on the HVD server 104 obtains a list of user device names and communication identifier information from the communications manager server 106. At operation 320, the communications application on the HVD server sends the username and the password of the user devices to the client device 102 using an extension mobility protocol message. The extension mobility protocol message is then sent from the client device 102 to the communications manager server 106 (e.g., at the instruction of the SIP stack 114 of the client device 102). Upon receiving this message, at operation 325, the communications manager server 106 then updates the client device 102 (which has already registered with the communications manager server 106) with the user's persona using the information in the extension mobility protocol message.

Thus, when the client device 102 is configured in the hot-desktop arrangement, the client device 102 does not register with the communications manager server 106 upon start-up. On the other hand, when the client device 102 is configured in the fixed-desktop arrangement, the client device 102 does register with the communications manager server 106 upon start-up, before initializing a session with the HVD server 104, and during this registration process, the client device 102 may be provisioned with an initial (non-user specific) phone number by the communications manager server 106. When the client device 102 subsequently obtains the extension mobility protocol message from the HVD server 104, the client device is assigned a new phone number upon re-registering with the communications manager server 106. This new number is associated with the communications identifier information of the user.

Figure 4:
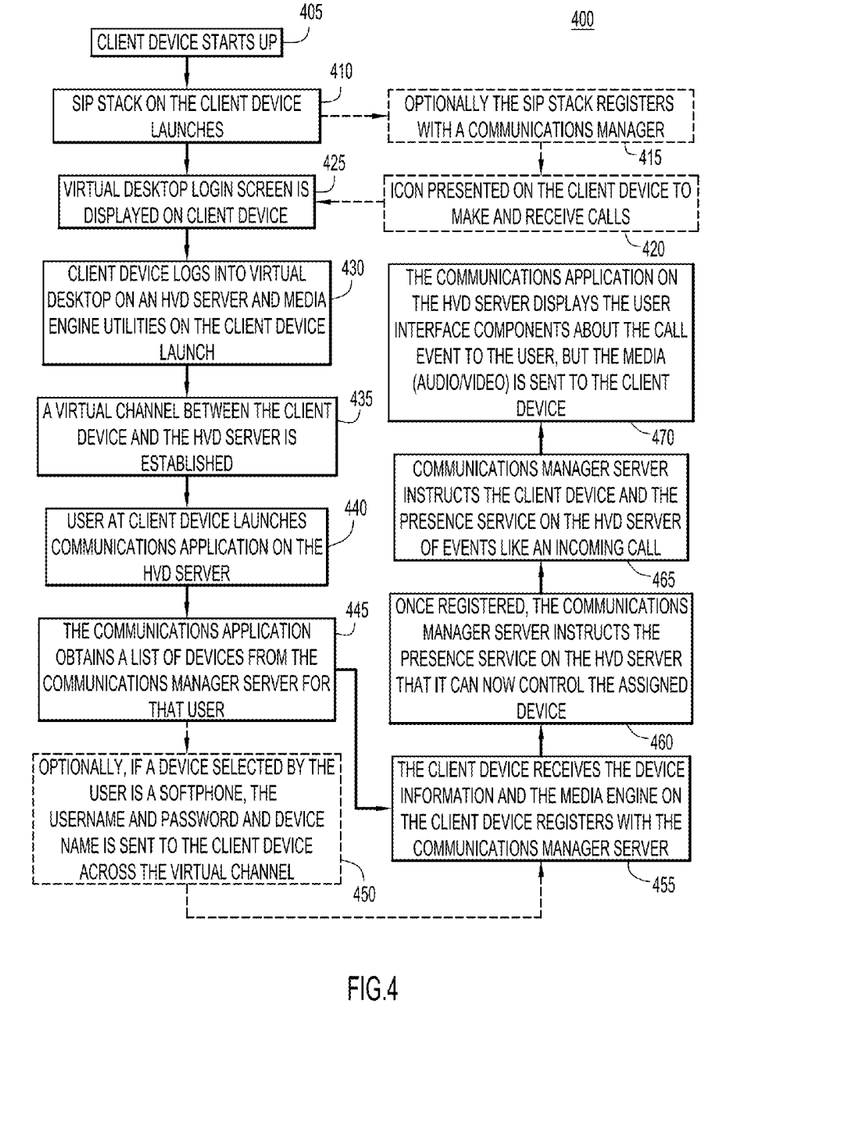
FIG. 4 shows an example flow chart depicting operations of the client device in the hot-desktop arrangement and the fixed-desktop arrangement to communicate with the HVD server and to register with the communications manager server.

Reference is now made to FIG. 4, with continued reference to FIG. 1. FIG. 4 shows an example flow chart 400 that depicts detailed operations performed by the client device 102 in the hot-desktop configuration and the fixed-desktop configuration to communicate with the HVD server 104 and to register with the communications manager server 106. It should be appreciated that in FIG. 4, the operations shown in the dashed lines are optional operations insofar as that they are performed when the client device operates as in the fixed-desktop configuration.

At 405, the client device 102 starts up, e.g., at the initiation of a user of the client device. As stated above, the user may desire to participate in a telephone conference, and prior to joining the telephone conference or otherwise using the telephony services enabled by the client device, the user needs to ensure that the client device 102 is associated with communication identifier information (e.g., a telephone number) that is assigned to him/her. In other words, the user may have been pre-assigned communication identifier information that is stored in the user device database 108 of the communication manager server 106, and this information is ultimately provided to the client device 102. As the user starts up the client device 102, the user may enter a username and password (or other log-in credentials) at the client device 102 (e.g., via a keyboard or other input).

At 410, the SIP stack 114 on the client device 102 launches. If the client device 102 is in the fixed-desktop configuration, at operation 415, the SIP stack 114 of the client device 102 registers with the communications manager server 106, and at operation 420, an icon is presented on the client device 102 that enables the user of the client device 102 to make and receive calls by assigning the client device 102 a non-user specific phone number. At 425 (when the client device is in the hot-desktop arrangement or the fixed-desktop arrangement), a virtual desktop login screen is displayed on the client device 102. The client device 102, at operation 430, logs into the virtual desktop in the HVD server 104 (e.g., by sending the username and password obtained during the user log-in) and the media engine utilities on the client device 102 launches. It should be appreciated that operation 430 is performed only for the client device 102 in the hot-desktop arrangement, and when the client device 102 is configured as a fixed-desktop, these utilities will have already launched. As stated above, the HVD server 104 hosts applications that are accessible by the client device 102.

When the username/password log-in information is validated by the HVD server 104, at operation 435, a virtual channel is established between the client device 102 and the HVD server 104. Additionally, after the HVD server 104 validates the user's log-in information, the HVD server 104 presents the client device 102 with a virtual desktop (e.g., a virtual desktop icon) that enables the user of the client device 102 to access services hosted by the HVD server 104. At 440, the client device 102 launches the communications application 110 on the HVD server 104. For example, the user of the client device 102 may launch the communications application 110 hosted by the HVD server 104 via a virtual desktop presented on the client device 102 by the HVD server 104.

After the user launches the communications application 110 on the HVD server 104, the communications application 110 on the HVD server 104 communicates with the communications manager server 106 and, at operation 445, obtains a list of user devices from the communications manager server 106 for the user of the client device 102. For example, as described above, the communications manager server 106 has the user device database 108 which stores a list of authorized users (by usernames) and corresponding communication identifier information (e.g., phone numbers and other call setting information) that has already been assigned to each user. At operation 450, when the client device is in the fixed-desktop arrangement, if the device selected by the user is a softphone, a username and password of the device is sent to the client device 102 from the HVD server 104 across the virtual channel. When the client is in the hot-desktop arrangement, the IP address of the communications manager server 106 and the device name is sent to the client device 102 from the HVD server 104 (e.g., from the communications application 110 of the HVD server 104).

At operation 455, when the client device 102 is in either the fixed-desktop arrangement or the hot-desktop arrangement, the client device 102 receives the device information, and the SIP stack 114 on the client device 102 registers with the communications manager server 106. The client device 102 registers with the communications manager server 106 to inform the communications manager server 106 that it is associated with the user (e.g., that it takes on the persona of the user, using the communication identifier information). When the client device 102 is in the fixed-desktop arrangement, this registration involves the client device 102 sending an extension mobility protocol message to the communications manager server 106 (thus, in essence, re-registering the client device 102 with the communications manager server 106 with a phone number and other profile information that is specific to the user). At operation 460, the communications manager server 106 instructs the communications application 110 on the HVD server 104 that it can now control the user device (e.g., the communication identifier information and other call information) that is assigned to the client device 102. Thus, the user is able to use the client device 102 to participate in a telephony service, e.g., a telephone conference, by using the communication identifier information that is uniquely associated with the user.

At operation 465, the communications manager server 106 instructs the client device 102 and the communications application 110 on the HVD server 104 of events, such as an incoming call. For example, the client device 102 may receive a notification of an incoming call at a new phone number that is associated with the communication identifier information of the user from the communication manager server 106 (e.g., via the virtual desktop on the client device 102). At operation 470, the communications application 110 on the HVD server 104 displays the user interface components about the call event to the user. The media (audio/video) is sent, however, to the client device 102 (e.g., the media engine 107 on the client device 102).

Figure 5:
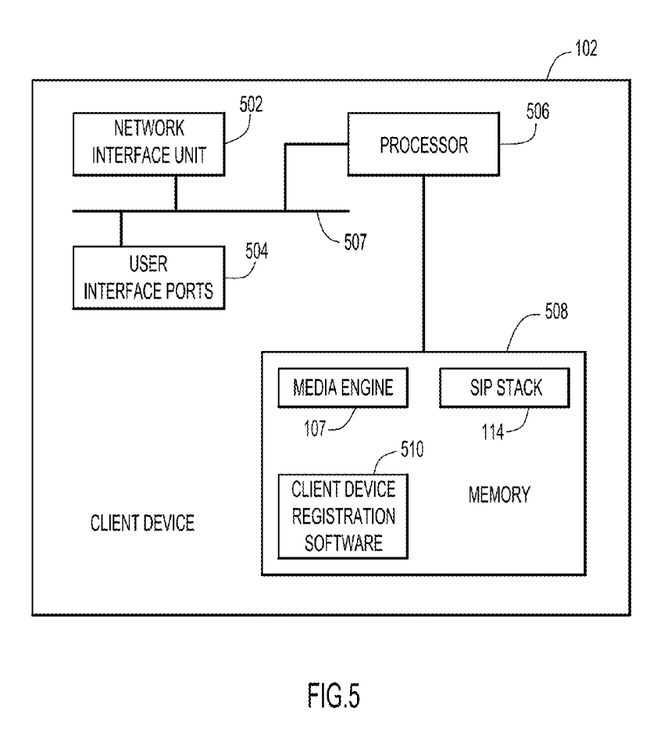
FIG. 5 is a block diagram of the client device that is configured to communicate with the HVD server and the communications manager server to take on a persona of a user.

Reference is now made to FIG. 5. FIG. 5 shows an example block diagram of the client device 102. The client device 102 comprises, among other components, a network interface unit 502, a plurality of user interface ports 504 and a processor 506. The network interface unit 502, the plurality of user interface ports 504 and the processor 506 are coupled to each other via a bus, shown at reference numeral 507. The client device 102 also has a memory 508.

The network interface unit 502 is configured to send and receive communications (e.g., data packets and telephone communications) in the network 100. The user interface ports 504 are configured to enable the user of the client device 102 to interact with the client device 102, e.g., to launch the virtual desktop of the client device 102. For example, the user interface ports 504 may include Universal Serial bus (USB) ports for a keyboard, mouse, as well as ports for a headset (microphone/earpiece), display, etc. The processor 506 is, for example, a microprocessor or microcontroller that is configured to execute program logic instructions (i.e., software) for carrying out various operations and tasks of the client device 102, as described herein. For example, the processor 506 is configured to execute the client device registration software 510 to register the client device 102 with a communications manager server 106 to enable the user to utilize the client device 102 for telephone communications. The functions of the processor 506 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 508 may comprise read only memory (ROM), random access memory (RAM), magnetic disk storage media devices, optical storage media devices, flash memory devices, electrical, optical, or other physical/tangible (non-transitory) memory storage devices. The memory 508 stores instructions for the client device registration software 510. The memory 508 also stores software instructions for the media engine 107 and instructions for a Session Initiation Protocol (SIP) stack 114 to allow for SIP call processing functions. Thus, in general, the memory 508 may comprise one or more computer readable storage media (e.g., a memory storage device) encoded with software comprising computer executable instructions and when the software is executed (e.g., by the processor 506) it is operable to perform the operations described herein.

The client device registration software 510 may take any of a variety of forms, so as to be encoded in one or more tangible computer readable memory media or storage device for execution, such as fixed logic or programmable logic (e.g., software/computer instructions executed by a processor), and the processor 506 may be an application specific integrated circuit (ASIC) that comprises fixed digital logic, or a combination thereof.

In still another example, the processor 506 may be embodied by digital logic gates in a fixed or programmable digital logic integrated circuit, which digital logic gates are configured to perform the client device registration software 510. In general, the client device registration software 510 may be embodied in one or more computer readable storage media encoded with software comprising computer executable instructions and when the software is executed operable to perform the operations described above.

Figure 6:
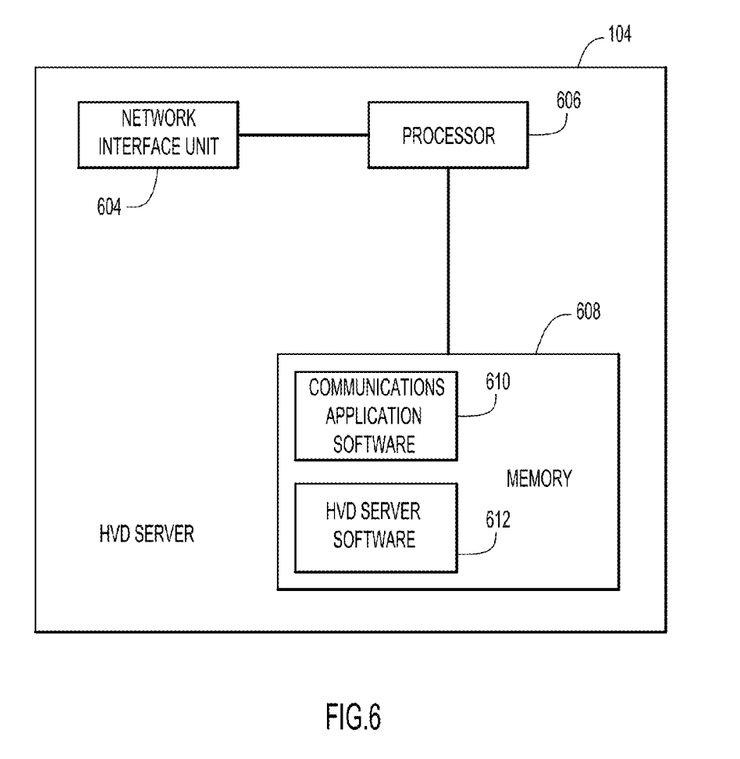
FIG. 6 is a block diagram of the HVD server that is configured to obtain communication identifier information of the user from the communications manager server.

Reference is now made to FIG. 6, which shows an example block diagram of the HVD server 104. The HVD server 104 comprises a network interface unit 604, a processor 606 and a memory 608. The network interface unit 604 is configured to send and receive communications in the network 100 (e.g., to the client device 102 and the communications manager server 106). The processor 606 is coupled to the network interface unit 604 and the memory 608. The processor 606 is, for example, a microprocessor or microcontroller similar to that described in connection with FIG. 5. The processor 606 is configured to execute program logic instructions (i.e., software) for carrying out various operations and tasks of the HVD server 104.

The memory 608 is similar to the memory 508 described in connection with FIG. 5, above. The memory 608 stores software communications application software 610 for the communications application 110 and the HVD server software 612. The HVD server software 612 comprises instructions to perform the various HVD server operations for client devices as well as to obtain the communication identifier information from the communications server 106.

It should be appreciated that the techniques described above in connection with all embodiments may be performed by one or more computer readable storage media that is encoded with software comprising computer executable instructions to perform the methods and steps described herein. For example, the operations performed by the client device 102 and the HVD server 104 may be performed by one or more computer or machine readable storage media (non-transitory) or device executed by a processor and comprising software, hardware or a combination of software and hardware to perform the techniques described herein.

In summary, a method is provided involving a client device initiating a session with a host virtual desktop (HVD) server to access a virtual desktop hosted by the HVD server; launching via the virtual desktop a communications application hosted by the HVD server to cause the communications application to obtain communication identifier information from a communications manager server; forwarding the communication identifier information from the HVD server to the client device; and registering the client device with the communications manager server using the communication identifier information to enable the client device to take on a persona of a user that is associated with the communication identifier information.

Additionally, an apparatus is provided comprising: a network interface unit configured to enable communications in a network on behalf of a client device; a plurality of user interface ports; a memory; and a processor coupled to the network interface unit, the user interface ports and the memory and configured to: initiate a session with a host virtual desktop (HVD) server to access a virtual desktop hosted by the HVD server; cause the virtual desktop to launch a communications application hosted by the HVD server to in turn cause the communications application to obtain communication identifier information from a communications manager server; receive the communication identifier information from the HVD server; and register the client device with the communications manager server using the communication identifier information to enable the client device to take on a persona of a user that is associated with the communication identifier information.

In addition, one or more computer readable storage media encoded with software is provided comprising computer executable instructions and when the software is executed operable to: initiate a session with a host virtual desktop (HVD) server to access a virtual desktop hosted by the HVD server; cause the virtual desktop a communications application hosted by the HVD server to in turn cause the communications application to obtain communication identifier information from a communications manager server; receive the communication identifier information from the HVD server; and register the client device with the communications manager server using the communication identifier information to enable the client device to take on a persona of a user that is associated with the communication identifier information.

The above description is intended by way of example only. Various modifications and structural changes may be made therein without departing from the scope of the concepts described herein and within the scope and range of equivalents of the claims.

What is claimed is:
1. A method comprising:
    at a thin client device, initiating a session with a host virtual desktop (HVD) server to access a virtual desktop hosted by the HVD server;
    launching via the virtual desktop a communications application hosted by the HVD server to cause the communications application to obtain communication identifier information comprising user data that is associated with a user, the communications application enabling the thin client device to participate in a telephone conference with other client devices via the HVD server, the user data including a phone number and call settings for the user, from a communications manager server;
    forwarding the communication identifier information from the HVD server to the thin client device; and
    registering the thin client device with the communications manager server via an extension mobility function of the communications manager server, using the communication identifier information to associate the thin client device with information that is specific to the user, thereby enabling the thin client device to take on a persona of the user.
2. The method of claim 1, wherein registering comprises registering a Session Initiation Protocol (SIP) stack on the thin client device with the communications manager server using the communication identifier information.
3. The method of claim 1, wherein registering comprises registering the thin client device with the communications manager server prior to initiating the session with the HVD server; and further comprising:
    receiving from the communications manager server a non-user specific phone number.
4. The method of claim 3, further comprising associating the non-user specific phone number with the communication identifier information upon receiving the communication identifier information from the communications manager server.
5. The method of claim 4, wherein associating comprises updating, via the extension mobility function of the communications manager server, the thin client device with the persona of the user based on the communication identifier information.
6. The method of claim 1, wherein forwarding comprises forwarding the communication identifier information comprising an Internet Protocol address associated with the communications manager server.
7. The method of claim 1, wherein forwarding comprises forwarding the communication identifier information comprising a username and a password associated with the user.
8. The method of claim 1, further comprising receiving a notification of an incoming call at a new phone number associated with the communication identifier information of the user from the communications manager server via the virtual desktop.
9. The method of claim 1, further comprising:
    at the thin client device, initiating a subsequent request for a session with the HVD server from the user;
    determining that the thin client device already has received the communication identifier information that is associated with the user; and
    utilizing the communication identifier information to enable the user to use either the thin client device to initiate and control a call when the thin client device has local phone capabilities or the HVD server to initiate and control the call, or both, without the thin client device receiving the communication identifier information from the HVD server again.
10. An apparatus comprising:
    a network interface unit configured to enable communications in a network on behalf of a thin client device;
    a plurality of user interface ports;
    a memory; and
    a processor coupled to the network interface unit, the user interface ports and the memory, and configured to:
        initiate a session with a host virtual desktop (HVD) server to access a virtual desktop hosted by the HVD server;
        cause the virtual desktop to launch a communications application hosted by the HVD server to in turn cause the communications application to obtain communication identifier information comprising user data that is associated with a user, the communications application enabling the thin client device to participate in a telephone conference with other client devices via the HVD server, the user data including a phone number and call settings for the user, from a communications manager server;
        receive the communication identifier information from the HVD server; and
        register the thin client device with the communications manager server via an extension mobility function of the communications manager server, using the communication identifier information to associate the thin client device with information that is specific to the user, thereby enabling the thin client device to take on a persona of the user.
11. The apparatus of claim 10, wherein the processor is further configured to register a Session Initiation Protocol (SIP) stack on the thin client device with the communications manager server using the communication identifier information.
12. The apparatus of claim 10, wherein the processor is further configured to:
    register the thin client device with the communications manager server prior to initiating the session with the HVD server; and receive from the communications manager server a non-user specific phone number.

13. The apparatus of claim 12, wherein the processor is further configured to associate the non-user specific phone number with the communication identifier information upon receiving the communication identifier information from the communications manager server.

14. The apparatus of claim 13, wherein the processor is further configured to receive a notification of an incoming call at a new phone number associated with the communication identifier information of the user from the communications manager server via the virtual desktop.

15. One or more non-transitory computer readable storage media encoded with software comprising computer executable instructions and when the software is executed operable to:
   initiate a session for a thin client device with a host virtual desktop (HVD) server to access a virtual desktop hosted by the HVD server;
   cause the virtual desktop to launch a communications application hosted by the HVD server to in turn cause the communications application to obtain communication identifier information comprising user data that is associated with a user, the communications application enabling the thin client device to participate in a telephone conference with other client devices via the HVD server, the user data including a phone number and call settings for the user, from a communications manager server;
   receive the communication identifier information from the HVD server; and
   register the thin client device with the communications manager server via an extension mobility function of the communications manager server, using the communication identifier information to associate the thin client device with information that is specific to the user, thereby enabling the thin client device to take on a persona of the user.

16. The non-transitory computer readable storage media of claim 15, wherein the instructions operable to register comprise instructions operable to register a Session Initiation Protocol (SIP) stack on the thin client device with the communications manager server using the communication identifier information.

17. The non-transitory computer readable storage media of claim 15, further comprising instructions operable to:
   register the thin client device with the communications manager server prior to initiating the session with the HVD server; and
   receive from the communications manager server a non-user specific phone number.

18. The non-transitory computer readable storage media of claim 17, further comprising instructions operable to associate the non-user specific phone number with the communication identifier information upon receiving the communication identifier information from the communications manager server.

19. The non-transitory computer readable storage media of claim 15, further comprising instructions operable to receive a notification of an incoming call at a new phone number associated with the communication identifier information of the user from the communications manager server via the virtual desktop.

20. The apparatus of claim 10, further comprising:
   initiate a subsequent request for a session with the HVD server from the user;
   determine that the thin client device already has received the communication identifier information that is associated with the user; and
   utilize the communication identifier information to enable the user to use either the thin client device to initiate and control a call when the thin client device has local phone capabilities or the HVD server to initiate and control the call, or both, without the thin client device receiving the communication identifier information from the HVD server again.

* * * * *